United States Patent [19]

Nakamura et al.

[11] Patent Number: 4,801,806
[45] Date of Patent: Jan. 31, 1989

[54] RADIATION IMAGE RECORDING AND REPRODUCING METHOD

[75] Inventors: Takashi Nakamura; Kenji Takahashi, both of Kanagawa, Japan

[73] Assignee: Fuji Photo Film Co., Ltd., Kanagawa, Japan

[21] Appl. No.: 184,881

[22] Filed: Apr. 22, 1988

Related U.S. Application Data

[62] Division of Ser. No. 846,919, Apr. 1, 1986.

[51] Int. Cl.$^4$ ................................................. G01T 1/10
[52] U.S. Cl. ............................... 250/484.1; 250/327.2
[58] Field of Search ........................... 250/484.1, 327.2

[56] References Cited

U.S. PATENT DOCUMENTS 4,554,453 11/1985 Feigt et al. ..................... 250/327.2
4,713,549 12/1987 Arakawa et al. ................ 250/484.1

OTHER PUBLICATIONS

Canon, "Chem. Abstr.", vol. 101, 1984, 23822j.
Fuji, "Chem. Abstr.", vol. 101, 1984, 201663w.
Radhakrishna et al., "Chem. Abstr.", vol. 85, 1976, 151993g.
Badchenko et al., "Chem. Abstr.", vol. 99, 1983, 166049s.

Primary Examiner—Jack Cooper
Attorney, Agent, or Firm—Gerald J. Ferguson, Jr.

[57] ABSTRACT

A bismuth activated alkali metal halide phosphor having the formula (I):

$$M^IX:xBi \qquad (I)$$

in which $M^I$ is at least one alkali metal selected from the group consisting of Rb and Cs; X is at least one halogen selected from the group consisting of Cl, Br and I; and x is a number satisfying the condition of $0 < x \leqq 0.2$. A process for the preparation of said phosphor, a radiation image recording and reproducing method utilizing said phosphor, and a radiation image storage panel employing said phosphor are also disclosed.

4 Claims, 2 Drawing Sheets

RADIATION IMAGE RECORDING AND REPRODUCING METHOD

This is a divisional application of Ser. No. 846,919 filed Apr. 1, 1986.

BACKGROUND OF THE INVENTION

Field of the Invention

The present invention relates to a novel stimulable phosphor, a process for the preparation of the same, a radiation image recording and reproducing method utilizing the same, and a radiation image storage panel employing the same. More particularly, the invention relates to a bismuth activated alkali metal halide stimulable phosphor.

Description of the Prior Art

For obtaining a radiation image, there has been conventionally employed a radiography utilizing a combination of a radiographic film having an emulsion layer containing a photosensitive silver salt and an intensifying screen.

As a method replacing the above-described radiography, a radiation image recording and reproducing method utilizing a stimulable phosphor as described, for example, in U.S. Pat. No. 4,239,968 has been recently paid much attention. The method involves the steps of causing a stimulable phosphor to absorb a radiation having passed through an object or having radiated from an object; sequentially exciting (or scanning) the phosphor with an electromagnetic wave such as visible light or infrared rays (stimulating rays) to release the radiation energy stored in the phosphor as light emission (stimulated emission); photoelectrically detecting the emitted light to obtain electric signals; and reproducing the radiation image of the object as a visible image from the electric signals.

In the radiation image recording and reproducing method, a radiation image is obtainable with a sufficient amount of information by applying a radiation to the object at a considerably smaller dose, as compared with the conventional radiography. Accordingly, this method is of great value, especially when the method is used for medical diagnosis.

As a stimulable phosphor employable in the abovedescribed method, U.S. Pat. No. 4,239,968 discloses a rare earth element activated alkaline earth metal fluorohalide phosphor having the formula:

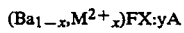
$(Ba_{1-x}M^{2+}{}_x)FX:yA$ in which $M^{2+}$ is at least one alkaline earth metal selected from the group consisting of Mg, Ca, Sr, Zn and Cd; X is at least one halogen selected from the group consisting of Cl, Br and I; A is at least one element selected from the group consisting of Eu, Tb, Ce, Tm, Dy, Pr, Ho, Nd, Yb and Er; and x and y are numbers satisfying the conditions of $0 \leq x \leq 0.6$ and $0 \leq y \leq 0.2$, respectively.

The phosphor gives emission (stimulated emission) in the near ultraviolet region when excited to an electromagnetic wave such as visible light or infrared rays after exposure to a radiation such as X-rays.

The above mentioned rare earth element activated alkaline earth metal halide phosphor has been previously known as a stimulable phosphor employable in the radiation image recording and reproducing method utilizing a stimulability thereof as described above, but almost no stimulable phosphor other than said phosphor has been known.

As a phosphor having the same alkali metal halide as host component as in the phosphor of the present invention, there has been previously known a thallium or sodium activated cesium iodide phosphor (CsI:Tl or CsI:Na). This phosphor gives emission (spontaneous emission) when exposed to a radiation such as X-rays, cathode rays and ultraviolet rays.

SUMMARY OF THE INVENTION

An object of the present invention is to provide a novel stimulable phosphor which is employable in the radiation image recording method, and a process for the preparation of the same.

Another object of the invention is to provide a radiation image recording and reproducing method utilizing the novel stimulable phosphor and a radiation image storage panel using said phosphor.

As a result of earnest studies, the present inventors have discovered that a specific bismuth activated alkali metal halide phosphor gives satisfactory stimulated emission There is provided by the present invention a bismuth activated alkali metal halide phosphor having the formula (I):

$$M^IX:xBi \qquad (I)$$

in which $M^I$ is at least one alkali metal selected from the group consisting of Rb and Cs; X is at least one halogen selected from the group consisting of Cl, Br and I; and x is a number satisfying the condition of $0 < x \leq 0.2$.

The phosphor having the formula (I) of the invention can be prepared by the process comprising:

mixing starting materials for the phosphor in a stoichiometric ratio corresponding to the formula (I):

$$M^IX:xBi \qquad (I)$$

in which $M^I$, X and x have the same meanings as defined above; and firing the obtained mixture at a temperature within the range of 500°–1000° C.

The bismuth activated alkali metal halide phosphor having the formula (I) gives stimulated emission in the near ultraviolet to blue region when excited with an electromagnetic wave having a wavelength within the range of 450–900 nm after exposure to a radiation such as X-rays, ultraviolet rays and cathode rays. Particularly, the phosphor having the formula (I) in which $M^I$ is Cs gives stimulated emission of high luminance.

The bismuth activated alkali metal halide phosphor having the formula (I) of the invention also gives spontaneous emission in the near ultraviolet to blue region when exposed to a radiation such as X-rays, ultraviolet rays and cathode rays.

The bismuth activated alkali metal halide phosphor having the formula (I) is employable in a radiation image recording and reproducing method which comprises the steps of:

(i) causing the bismuth activated alkali metal halide phosphor having the formula (I) to absorb a radiation having passed through an object or having radiated from an object;

(ii) exciting said stimulable phosphor with an electromagnetic wave having a wavelength within the range of 450–900 nm to release the radiation energy stored therein as light emission; and (iii) detecting the emitted light.

Especially, a phosphor having the formula (I) in which $M^I$ is Cs shows prominently high sensitivity in the use for the radiation image recording and reproducing method.

In performing the above-described radiation image recording and reproducing method, the bismuth activated alkali metal halide phosphor having the formula (I) is advantageously employed in the form of a radiation image storage panel. The radiation image storage panel comprises a support and at least one stimulable phosphor layer provided thereon which comprises a binder and a stimulable phosphor dispersed therein, in which at least one phosphor layer contains the bismuth activated alkali metal halide phosphor having the formula (I).

DETAILED DESCRIPTION OF THE INVENTION

Figure 1:
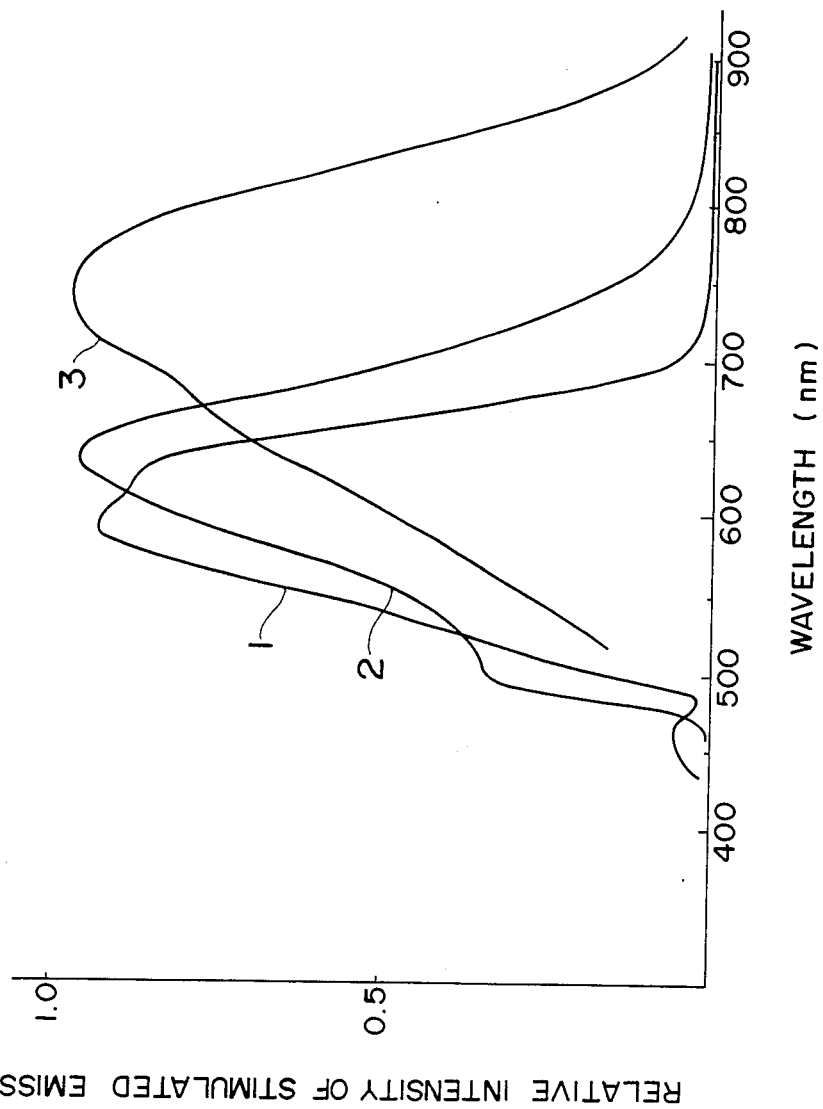
FIG. 1 shows stimulation spectra of CsCl:0.001Bi phosphor, CsBr:0.001Bi phosphor and CsI:0.001Bi phosphor (Curves 1, 2 and 3, respectively), which are examples of the bismuth activated alkali metal halide phosphor according to the invention.

The bismuth activated alkali metal halide phosphor of the present invention can be prepared, for instance, by the process described below.

As starting materials, the following materials can be employed:

(1) at least one alkali metal halide selected from the group consisting of RbCl, CsCl, RbBr, CsBr, RbI and CsI; and (2) at least one compound selected from the group consisting of bismuth compounds such as bismuth halide, bismuth oxide, bismuth nitrate and bismuth sulfate.

Further, ammonium halide ($NH_4X''$, in which $X''$ is any one of Cl, Br and I) may be employed as a flux.

In the process for the preparation of the phosphor of the invention, the above-mentioned alkali metal halide (1) and bismuth compound (2) are, in the first place, mixed in the stoichiometric ratio corresponding to the formula (I):

in which $M^I$, and x have the same meanings as defined above.

In the preparation of the phosphor of the invention, mainly from the viewpoint of enhancement in the luminance of stimulated emission, $M^I$ in the formula (I) which indicates alkali metal is preferably Cs, and the number for x which indicates the amount of bismuth activator is preferably within the range of $5 \times 10^{-4} \leq x \leq 10^{-2}$.

The mixture of starting materials for the phosphor is prepared by any one of the following procedures;

(i) simply mixing the starting materials (1) and (2); and (ii) mixing the starting materials (1) and (2) in the form of a solution, and then drying the solution under reduced pressure, under vacuum or by spray drying under heating (preferably, 50°–200° C.).

The mixing is carried out using a conventional mixing apparatus such as a variety of mixers, a V-type blender, a ball mill and a rod mill in any case of the above-described procedures (i) and (ii).

Then, the resulting mixture of the starting materials is placed in a heat-resistant container such as a quartz boat, an alumina crucible or a quartz crucible, and fired in an electric furnace. The temperature for the firing suitably ranges from 500° to 1,000° C., and preferably ranges from 600° to 800° C. The firing period is determined depending upon the amount of the mixture of starting materials, the firing temperature, etc., and suitably ranges from 0.5 to 6 hours. As the firing atmosphere, there can be employed a weak reducing atmosphere such as a nitrogen gas atmosphere containing a small amount of hydrogen gas or a carbon dioxide gas atmosphere containing carbon monoxide gas; an inert gas atmosphere such as a nitrogen gas atmosphere or an argon gas atmosphere; or an oxidizing atmosphere such as an air.

Through the firing procedure, a powdery phosphor of the present invention is produced. The powdery phosphor thus obtained may be processed in the conventional manner involving a variety of procedures for the preparation of phosphors such as a washing procedure, a drying procedure and a sieving procedure.

The phosphor of the invention prepared in accordance with the above-described process is a bismuth activated alkali metal halide phosphor having the formula (I):

in which $M^I$ is at least one alkali metal selected from the group consisting of Rb and Cs; X is at least one halogen selected from the group consisting of Cl, Br and I; and x is a number satisfying the condition of $0 < x \leq 0.2$.

The bismuth activated alkali metal halide phosphor of the invention gives stimulated emission in the near ultraviolet to blue region when excited with an electromagnetic wave having a wavelength within the range of 450–900 nm such as visible light or infrared rays after exposure to a radiation such as X-rays, ultraviolet rays and cathode rays.

FIG. 1 shows stimulation spectra of CsCl:Bi phosphor, CsBr:Bi phosphor and CsI:Bi phosphor (Curves 1, 2 and 3, respectively), which are examples of the bismuth activated alkali metal halide phosphor according to the invention.

As is evident from FIG. 1, the phosphors of the invention give stimulated emission upon excitation with an electromagnetic wave in the wavelength region of 450–900 nm. As is also evident from FIG. 1, peaks of the stimulation spectra of the phosphors according to the invention are positioned in the longer wavelength side depending upon X of CsX which is host component of the phosphor in such an order of X as Cl (Curve 1), Br (Curve 2) and I (Curve 3). Particularly, the phosphor in which X is I is efficiently excited with infrared rays such as a semiconductor laser beam. Based on this fact, the wavelength region of the electromagnetic wave employed as stimulating rays, namely 450–900 nm, has been decided for adoption in the radiation image recording and reproducing method of the present invention.

Figure 2:
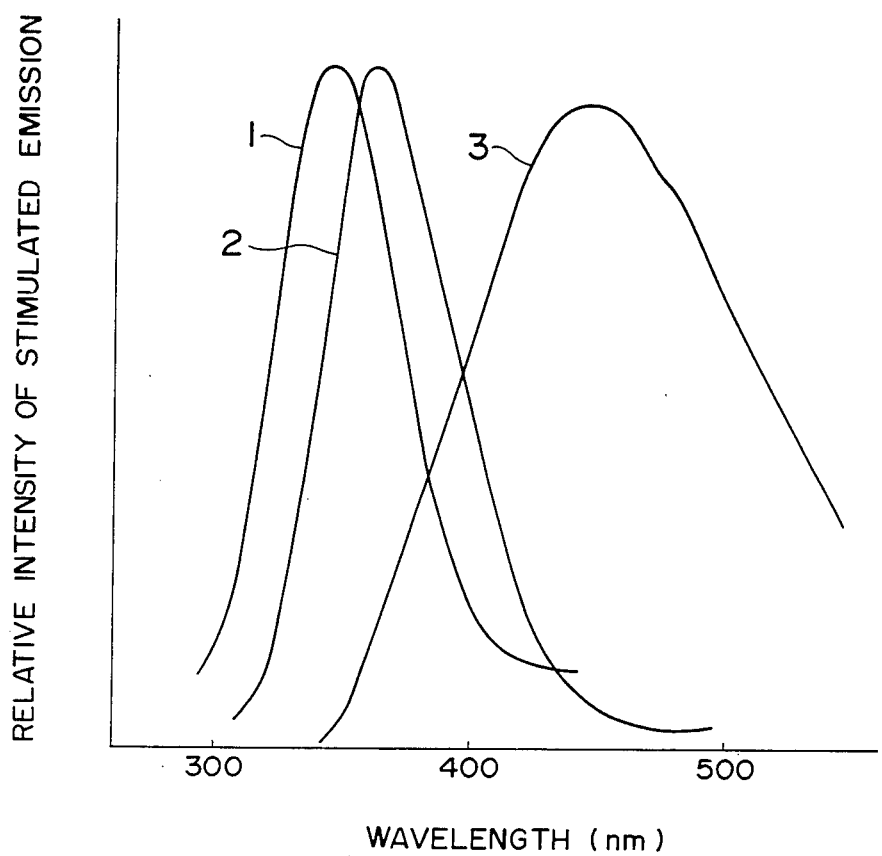
FIG. 2 shows stimulated emission spectra of CsCl:0.001Bi phosphor, CsBr:0.001Bi phosphor and CsI:0.001Bi phosphor (Curves 1, 2 and 3, respectively), which are examples of the bismuth activated alkali metal halide phosphor according to the invention.

FIG. 2 shows stimulated emission spectra of the above-mentioned CsCl:Bi phosphor, CsBr:Bi phosphor and CsI:Bi phosphor (Curves 1, 2 and 3, respectively), which are examples of the bismuth activated alkali metal halide phosphor according to the invention.

As is evident from FIG. 2, the phosphors according to the invention give stimulated emission in the near ultraviolet to blue region, and each peak wavelength of the emission spectra is within the range of approx. 350–450 nm. Accordingly, when the phosphor of the invention is excited with an electromagnetic wave having a wavelength within the range of 500–850 nm after exposure to a radiation, it is easy to separate the stimulated emission from the stimulating rays, and the stimulated emission shows high intensity. As is also evident from FIG. 2, peaks of the stimulated emission spectra of the phosphors of the invention are positioned in the longer wavelength side depending upon X of CsX which constitutes the phosphor in such an order of X as Cl (Curve 1), Br (Curve 2) and I (Curve 3) in the same manner as the peaks of the above-described stimulation spectra.

The stimulated emission spectra and stimulation spectra of the bismuth activated alkali metal phosphors according to the present invention are described above with reference to FIGS. 1 and 2, for the specific phosphors. It has been further confirmed that other phosphors according to the invention show similar stimulation spectra to those of the above-mentioned specific phosphors, and further confirmed that they give similar stimulated emission spectra to those of the above-mentioned specific phosphors, that is, stimulated emission spectra in the near ultraviolet to blue region, when excited with an electromagnetic wave having a wavelength within the range of 450–900 nm afer exposure to a radiation, and that each peak wavelength of the stimulated emission spectra is within the range of approx. 350–450 nm.

The bismuth activated alkali metal halide phosphor of the present invention further gives emission (spontaneous emission) in the near ultraviolet to blue region upon excitation with a radiation such as X-rays, ultraviolet rays and cathode rays, and the spontaneous emission spectrum thereof is almost the same as the stimulated emission spectrum thereof.

Since the wavelength region of the stimulation spectrum of the bismuth activated alkali metal phosphor of the invention is so wide as 450–900 nm, it is possible to optionally vary the wavelength of stimulating rays for exciting the phosphor in the radiation image recording and reproducing method of the invention. It means that a source of stimulating rays can be appropriately selected according to the purpose. For example, a semiconductor laser (having a wavelength in the infrared region) which is in a small size and needs only weak driving power can be employed as source of stimulating rays, and accordingly the system for carrying out the method can be made compact. Particularly when the phosphor having iodine as halogen which constitutes host component is employed in the method, the phosphor can be efficiently excited using a semiconductor laser as a source of stimulating rays. From the viewpoints of the luminance of stimulated emission and of the separation on wavelength between the emitted light and stimulating rays, the stimulating rays are preferred to be an electromagnetic wave having a wavelength within the range of 500–850 nm.

From the viewpoint of emission properties described hereinbefore, the phosphor of the invention is very useful as a phosphor for a radiation image storage panel employed in the radiation image recording and reproducing method, or for a radiographic intensifying screen employed in the conventional radiography, both panel and screen being used in medical radiography such as X-ray photography for medical diagnosis and industrial radiography for non-destructive inspection.

The bismuth activated alkali metal halide phosphor having the formula (I) is preferably employed in the form of a radiation image storage panel (also referred to as a stimulable phosphor sheet) in the radiation image recording and reproducing method of the invention.

The radiation image storage panel basically comprises a support and at least one phosphor layer provided on a surface of the support. The phosphor layer comprises a binder and a stimulable phosphor dispersed therein. Further, a transparent protective film is generally provided on the free surface of the phosphor layer (surface not facing the support) to keep the phosphor layer from chemical deterioration or physical damage.

The radiation image recording and reproducing method of the invention is desired to be performed employing the radiation image storage panel comprising a phosphor layer which contains the bismuth activated alkali metal halide phosphor having the formula (I).

In the radiation image recording and reproducing method employing the stimulable phosphor having the formula (I) in the form of a radiation image storage panel, a radiation having passed through an object or radiated from an object is absorbed by the phosphor layer of the panel to form a radiation image as a radiation energy-stored image on the panel. The panel is then irradiated (e.g., scanned) with an electromagnetic wave in the wavelength region of 450–900 nm to release the stored image as stimulated emission. The emitted light is photoelectrically detected to obtain electric signals so that the radiation image of the object can be reproduced as a visible image from the obtained electric signals.

The radiation image recording and reproducing method of the present invention will be described more in detail with respect to an example of a radiation image storage panel containing the stimulable phosphor having the formula (I), by referring to a schematic view shown in FIG. 3.

Figure 3:
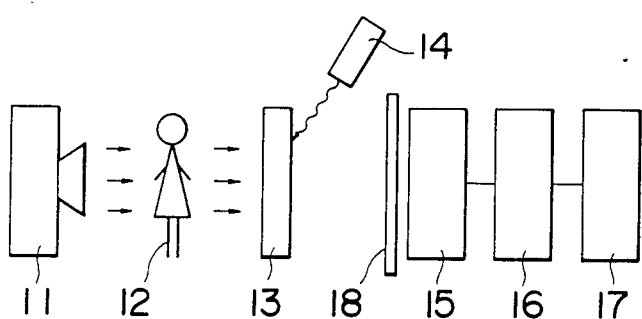
FIG. 3 is a schematic view showing the radiation image recording and reproducing method according to the invention.

In FIG. 3 which shows a total system of the radiation image recording and reproducing method of the invention, a radiation generating device 11 such as an X-ray source provides a radiation for irradiating an object 12 therewith; a radiation image storage panel 13 containing the stimulable phosphor having the formula (I) absorbs and stores the radiation having passed through the object 12; a source of stimulating rays 14 provides an electromagnetic wave for releasing the radiation energy stored in the panel 13 as light emission; a photosensor 15 such as a photomultiplier faces the panel 13 for detecting the light emitted by the panel 13 and converting it to electric signals; an image reproducing device 16 is connected with the photosensor 15 to reproduce a radiation image from the electric signals detected by the photosensor 15; a display device 17 is connected with the reproducing device 16 to display the reproduced image in the form of a visible image on a CRT or the like; and a filter 18 is disposed in front of the photosensor 15 to cut off the stimulating rays reflected by the panel 13 and allow only the ligth emitted by the panel 13 to pass through.

FIG. 3 illustrates an example of the system according to the method of the invention employable for obtaining a radiation-transmission image of an object. However, in the case that the object 12 itself emits a radiation, it is unnecessary to install the above-mentioned radiation generating device 11. Further, the photosensor 15 to the display device 17 in the system can be replaced with other appropriate devices which can reproduce a radiation image having the information of the object 12 from the light emitted by the panel 13.

Referring to FIG. 3, when the object 12 is exposed to a radiation such as X-rays provided by the radiation generating device 11, the radiation passes through the object 12 in proportion to the radiation transmittance of each portion of the object. The radiation having passed through the object 12 impinges upon the radiation image storage panel 13, and is absorbed by the phosphor layer of the panel 13. Thus, a radiation energy-stored image (a kind of latent image) corresponding to the radiation-transmission image of the object 12 if formed on the panel 13.

Thereafter, when the radiation image storage panel 13 is irradiated with an electromagnetic wave having the wavelength within the range of 450–900 nm, which is provided by the source of stimulating rays 14, the radiation energy-stored image formed on the panel 13 is released as light emission. The intensity of so released light is in proportion to the intensity of the radiation energy which has been absorbed by the phosphor layer of the panel 13. The light signals corresponding to the intensity of the emitted light are converted to electric signals by means of the photosensor 15, the electric signals are reproduced as an image in the image reproducing device 16, and the reproduced image is displayed on the display device 17.

The operation of reading out the image information stored in the radiation image storage panel is generally performed by sequentially scanning the panel with a laser beam and detecting the light emitted under the scanning with a photosensor such as photomultiplier through an appropriate light guiding means to obtain electric signals. In order to obtain a well-readable visible image, the read-out operation may comprise a preliminary readout operation and a final read-out operation, in which the panel is twice irradiated with stimulating rays though the energy of the stimulating rays in the former is lower than that in the latter (see: U.S. patent application Ser. No. 434,886). The read-out condition in the final read-out operation can be suitably chosen based on the result obtained by the preliminary read-out operation.

As the photosensors, solid-state photoelectric conversion devices such as a photoconductor and a photodiode can be also used (see: U.S. patent application Ser. No. 610,582, Japanese Patent Applications No. 58(1983)-219313 and No. 58(1983)-219314, and Japanese Patent Provisional Publication No. 58(1983)-121874). For example, the photosensor is divided into a great number of pixels, which may be combined with a radiation image storage panel or positioned in the vicinity of the panel. Otherwise, the photosensor may be a linesensor in which plural pixels are linearly connected or may be such one that corresponds to one pixel.

In the above-mentioned cases, there may be employed as the source of stimulating rays, a linear light source such as an array in which light emitting diodes (LED), semiconductor lasers or the like are linearly arranged, in addition to a point light source such as a laser. The read-out using such photosensor can prevent loss of the light emitted by a panel and can bring about the enhancement of S/N ratio of the image, because the photosensor can receive the emitted light with a large angle. It is also possible to enhance the read-out speed, because electric signals are sequentially obtained not by scanning the panel with stimulating rays, but by electrical processing of the photosensor.

After reading out the image information stored in a radiation image storage panel, the panel is preferably subjected to a procedure of erasing the radiation energy remaining therein, that is, to the exposure to light having a wavelength in the wavelength region of stimulating rays for the phosphor contained therein or to heating (see: U.S. Pat. No. 4,400,619 and Japanese Patent Provisional Publication No. 56(1981)-12599). The erasing procedure can prevent the occurrence of noise originating from the after image in the next use of the panel. Further, the panel can be more effectively prevented from the occurrence of noise attributable to natural radiations by carrying out the erasing procedure twice, namely after the read-out and just before the next use (see: U.S. Pat. application Ser. No. 338,734).

In the radiation image recording and reproducing method of the present invention, there is no specific limitation on the radiation employable for exposure of an object to obtain a radiation transmittance image thereof, as far as the above-described phosphor gives stimulated emission upon excitation with the electromagnetic wave after exposure to the radiation. Examples of the radiation employable in the invention include those generally known, such as X-rays, cathode rays and ultraviolet rays. Likewise, there is no specific limitation on the radiation radiating from an object for obtaining a radiation image thereof, so far as the radiation can be absorbed by the above-described phosphor to serve as an energy source for producing the stimulated emission. Examples of the radiation include $\gamma$-rays, $\alpha$-rays and $\beta$-rays.

As the source of stimulating rays for exciting the phosphor which has absorbed the radiation having passed through or radiated from the object, there can be employed, for instance, light sources providing light having a band spectrum distribution in the wavelength region of 450–900 nm; and light sources providing light having a single wavelength or more in said region such as an Ar ion laser, a He-Ne laser, a ruby laser, a semiconductor laser, a glass laser, a YAG laser, a Kr ion laser, a dye laser and a light emitting diode (LED). Among these sources of stimulating rays, the lasers are preferred because the radiation image storage panel is exposed thereto with a high energy density per unit area. Particularly preferred is the He-Ne laser from the viewpoints of the stability and output power thereof. The semiconductor laser is also preferred, because its size is small, it can be driven by a weak electric power and its output power can be easily stabilized owing to the direct modulation thereof.

The semiconductor laser is particularly preferably employed as a source of stimulating rays for exciting the phosphor having iodine(I) as halogen which constitutes the host component, because the phosphor can be efficiently excited therewith as described hereinbefore.

The radiation image storage panel employable in the radiation image recording and reproducing method of the invention will be described.

The radiation image storage panel, as stated hereinbefore, comprises a support and at least one phosphor layer provided thereon which comprises a binder and the above-described bismuth activated alkali metal halide phosphor having the formula (I) dispersed therein.

The radiation image storage panel having such structure can be prepared, for instance, in the manner described below.

Examples of the binder to be employed in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate butyrate, polyvinyl alcohol, and linear polyester. Particularly preferred are nitrocellulose, linear polyester, polyalkyl (meth)acrylate, a mixture of nitrocellulose and linear polyester, and a mixture of nitrocellulose and polyalkyl (meth)acrylate.

The phosphor layer can be formed on a support, for instance, by the following procedure.

In the first place, the stimulable phosphor particles and a binder are added to an appropriate solvent, and then they are mixed to prepare a coating dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monomethylether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder : phosphor, by weight), preferably from 1:8 to 1:40.

The coating dispersion may contain a dispersing agent to assist dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and a hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

A support material employed in the present invention can be selected from those employed in the conventional radiographic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From the viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a high-sharpness type radiation image storage panel, while the latter is appropriate for preparing a high-sensitive type radiation image storage panel.

In the preparation of a known radiation image storage panel, one or more additional layers are occasionally provided between the support and the phosphor layer, so as to enhance the adhesion between the support and the phosphor layer, or to improve the sensitivity of the panel or the quality of an image (sharpness and graininess) provided thereby. For instance, a subbing layer or an adhesive layer may be provided by coating a polymer material such as gelatin over the surface of the support on the phosphor layer side. Alternatively, a light-reflecting layer or a light-absorbing layer may be provided by forming a polymer material layer containing a light-reflecting material such as titanium dioxide or a light-absorbing material such as carbon black. In the invention, one or more of these additional layers may be provided and the constitution thereof can be selected according to the purpose of the radiation image storage panel.

As described in U.S. patent application Ser. No. 496,278 or European Patent Publication No. 92241, the phosphor layer-side surface of the support (or the surface of an adhesive layer, light-reflecting layer, or light-absorbing layer in the case that such layers are provided on the phosphor layer) may be provided with protruded and depressed portions for enchancement of the sharpness of radiation image.

After applying the coating dispersion to the support as described above, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within the range of from 20 $\mu$m to 1 mm, preferably from 50 to 500 $\mu$m.

The phosphor layer can be provided on the support by the methods other than that given in the above. For instance, the phosphor layer is initially prepared on a sheet (false support) such as a glass plate, metal plate or plastic sheet using the aforementioned coating dispersion and then thus prepared phosphor layer is overlaid on the genuine support by pressing or using an adhesive agent.

The phosphor layer placed on the support can be in the form of a single layer or in the form of plural (two or more) layers. When the plural phosphor layers are placed on the support, at least one layer contains the aforementioned bismuth activated alkali metal halide phosphor having the formula (I), and the plural layers may be placed in such a manner that a layer nearer to the surface shows stimulated emission of higher intensity. In any case, that is, in either the single phosphor layer or plural phosphor layers, a variety of known stimulable phosphors are employable in combination with the abovementioned stimulable phosphor.

Examples of the stimulable phosphor employable in combination with the stimulable phosphor of the invention include the aforementioned phosphor and the phosphors described below;

ZnS:Cu,Pb, BaO.xAl$_2$O$_3$:Eu, in which x is a number satisfying the condition of $0.8 \leq x \leq 10$, and M$^{II}$O·xSiO$_2$:A, in which M$^{II}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $0 < x+y \leq 0.6$, and $xy = 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078; and M$^{II}$X$_2$·aM$^{II}$X'$_2$:xEu$^{2+}$, in which M$^{II}$ is at least one alkaline earth metal selected from the group consisting of Ba, Sr and Ca; each of X and X' is at least one halogen selected from the group consisting of Cl, Br and I, and X ≠ X'; and a and x are numbers satisfying the conditions of $0.1 \leq a \leq 10.0$ and $0 < x \leq 0.2$, respectively, as described in Japanese Patent Provisional Publication No. 58(1983)-193162.

The radiation image storage panel generally has a transparent film on a free surface of a phosphor layer to physically and chemically protect the phosphor layer. In the panel of the invention, it is preferable to provide a transparent film for the same purpose.

The transparent film can be provided on the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided on the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within the range of approximately 0.1 to 20 μm.

The present invention will be illustrated by the following examples, but these examples by no means restrict the invention.

EXAMPLE 1

186.4 g. of cesium chloride (CsCl) and 0.266 g. of bismuth fluoride (BiF$_3$) were well mixed in a ball mill, to obtain a mixture of starting materials for the preparation of a phosphor.

The mixture thus obtained was placed in an alumina crucible, which was, in turn, placed in a high-temperature electric furnace. The mixture was then fired at 600° C. for 2 hours. After the firing was complete, the crucible was taken out of the furnace and allowed to stand for cooling. Thus, a powdery bismuth activated cesium chloride (CsCl:0.001Bi) phosphor was obtained.

EXAMPLE 2

The procedure of Example 1 was repeated except for using 212.8 g. of cesium bromide (CsBr) instead of cesium chloride, to obtain a powdery bismuth activated cesium bromide (CsBr:0.001Bi) phosphor.

EXAMPLE 3

The procedure of Example 1 was repeated except for using 259.8 g. of cesium iodide (CsI) instead of cesium chloride, to obtain a powdery bismuth activated cesium iodide (CsI:0.001Bi) phosphor.

The phosphors prepared in Examples 1 to 3 were excited with a He-Ne laser (wavelength: 632.8 nm) after exposure to X-rays at 80 KVp, to measure stimulated emission spectra. The results are shown in FIG. 2.

In FIG. 2, Curves 1 to 3 correspond to the following spectra:
1: stimulated emission spectrum of CsCl:0.001Bi phosphor (Example 1);
2: stimulated emission spectrum of CsBr:0.001Bi phosphor (Example 2); and
3: stimulated emission spectrum of CsI:0.001Bi phosphor (Example 3).

The phosphors prepared in Examples 1 to 3 were excited with a light whose wavelength was varied in the range of 450–1,000 nm after exposure to X-rays at 80 KVp, to measure stimulation spectra at each peak wavelength of the stimulated emission thereof. The results are shown in FIG. 1.

In FIG. 1, Curves 1 to 3 correspond to the following spectra:
1: stimulation spectrum of CsCl:0.001Bi phosphor (Example 1);
2: stimulation spectrum of CsBr:0.001Bi phosphor (Example 2); and
3: stimulation spectrum of CsI:0.001Bi phosphor (Example 3).

Further, the phosphors prepared in Examples 1 to 3 were excited with the He-Ne laser after exposure to X-rays at 80 KVp, to measure the intensity of stimulated emission. The intensity of stimulated emission was measured by using a band pass filter (B-390; peak wavelength: 390 nm, half band width: 60 nm, transmissivity of peak wavelength: 78%) as a filter for receiving the stimulated emission. The results are set forth in Table 1.

In Table 1, the intensity of stimulated emission is expressed by a relative value based on the intensity of stimulated emission of CsI:0.001Bi phosphor obtained in Example 3 being 100.

TABLE 1

| | Relative Intensity of Stimulated Emission |
|---|---|
| Example 1 | 500 |
| 2 | 700 |
| 3 | 100 |

EXAMPLE 4

Radiation image storage panels were prepared in the following manner using the three kinds of bismuth activated alkali metal halide phosphors obtained in Examples 1 to 3.

To a mixture of the powdery phosphor and a linear polyester resin were added successively methyl ethyl ketone and nitrocellulose (nitration degree: 11.5%), to prepare a dispersion containing the phosphor and the binder (10:1, by weight). Subsequently, tricresyl phosphate, n-butanol and methyl ethyl ketone were added to the dispersion. The mixture was sufficiently stirred by means of a propeller agitater to obtain a homogeneous coating dispersion having a viscosity of 25-35 PS (at 25° C.).

The coating dispersion was applied to a polyethylene terephthalate sheet containing titanium dioxide (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 250 μm was formed on the support.

On the phosphor layer was placed a transparent polyethylene terephthalate film (thickness: 12 μm, provided with a polyester adhesive layer on one surface) to combine the transparent film and the phosphor layer with the adhesive layer.

Thus, a radiation image storage panel consisting essentially of a support, a phosphor layer and a transparent protective film was prepared.

The radiation image storage panels prepared in Example 4 were measured on the sensitivity (i.e., intensity of stimulated emission) when excited with a He-Ne laser (wavelength: 632.8 nm) after exposure to X-rays at 80 KVp. The measurement of the sensitivity thereof was done by using a band pass filter (B-390; peak wavelength: 390 nm, half band width: 60 nm, transmissivity of peak wavelength: 78%) as a filter for receiving stimulated emission. The results are set forth in Table 2.

In Table 2, the sensitivity of the radiation image storage panels is expressed by a relative value based on the sensitivity of the panel using the CsI:0.001Bi phosphor obtained in Example 3 being 100.

TABLE 2

| | Relative Sensitivity |
|---|---|
| Panel using CsCl:0.001Bi phosphor (Example 1) | 500 |
| Panel using CsBr:0.001Bi phosphor (Example 2) | 700 |
| Panel using CsI:0.001Bi phosphor (Example 3) | 100 |

What is claimed is:

1. A radiation image recording and reproducing method comprising the steps of:
   (i) causing a bismuth activated alkali metal halide stimulable phosphor having the formula (I):

$$M^I X : xBi \qquad (I)$$

in which $M^I$ is at least one alkali metal selected from the group consisting of Rb and Cs; X is at least one halogen selected from the group consisting of Cl, Br and I; and x is a number satisfying the condition of $5 \times 10^{-4} \leq x \leq 10^{-2}$, to absorb a radiation having passed through an object or having radiated from an object;
   (ii) exciting said stimulable phosphor with an electromagnetic wave having a wavelength within the range of 450-900 nm to release the radiation energy stored therein as light emission in the wavelength range of approximately 350-450 nm; and
   (iii) detecting the emitted light.

2. The radiation image recording and reproducing method as claimed in claim 1, in which $M^I$ in the formula (I) is Cs.

3. The radiation image recording and reproducing method as claimed in claim 1, in which said electromagnetic wave is one having a wavelength within the range of 500-850 nm.

4. The radiation image recording and reproducing method as claimed in claim 1, in which said electromagnetic wave is a laser beam.

* * * * *